J. B. BAUM.
DIRIGIBLE HEADLIGHT.
APPLICATION FILED APR. 28, 1908.
936,211.
Patented Oct. 5, 1909.
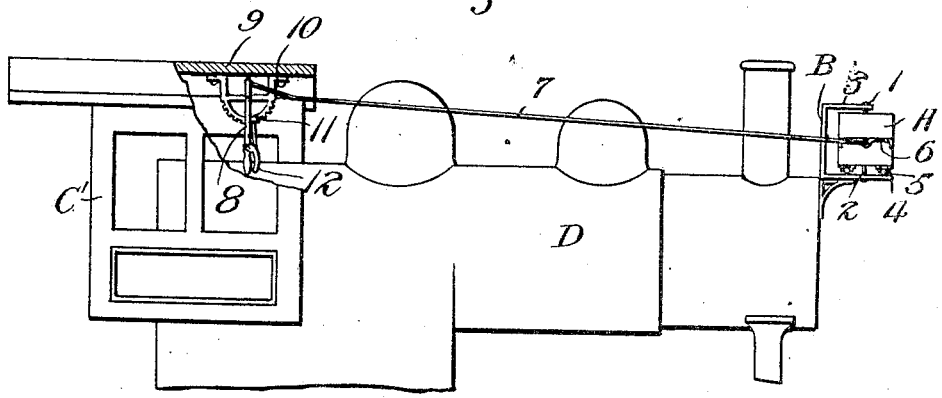
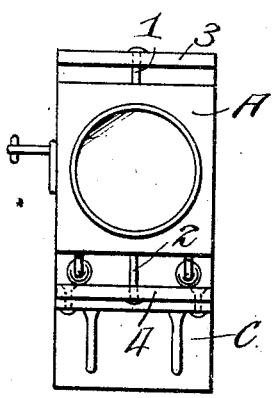
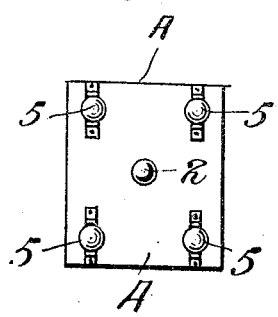
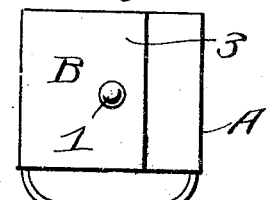
Witnesses
Hugh H. Ott
C. Bradway
Inventor
James B. Baum
By Victor J. Evans
Attorney

UNITED STATES PATENT OFFICE.

JAMES B. BAUM, OF GRAND JUNCTION, COLORADO, ASSIGNOR OF ONE-SIXTH TO THOMAS P. McGUIRE, ONE-SIXTH TO PHIL MOESER, ONE-SIXTH TO A. A. MILLER, ONE-TWELFTH TO J. A. McCULLOCH, ONE-TWELFTH TO W. E. RHINHART, AND ONE-TWELFTH TO CHARLES F. GIBBS, ALL OF GRAND JUNCTION, COLORADO.

DIRIGIBLE HEADLIGHT.

936,211.      Specification of Letters Patent.      Patented Oct. 5, 1909.

Application filed April 28, 1908. Serial No. 429,670.

*To all whom it may concern:*

Be it known that I, JAMES B. BAUM, a citizen of the United States, residing at Grand Junction, in the county of Mesa and State of Colorado, have invented new and useful Improvements in Dirigible Headlights, of which the following is a specification.

This invention relates to a headlight for locomotives and mechanism whereby the engineer can manipulate the headlight to throw the rays in any direction so as to light up the track as in passing around curves.

The invention has for one of its objects to improve and simplify the construction and operation of devices of this character so as to be comparatively easy and inexpensive to manufacture, reliable in use, and which is designed to be used as an attachment that is adapted to be applied to any locomotive.

A further object of the invention is the provision of a headlight mounted in a frame to turn on a vertical axis and positioned at the usual point at the front of the locomotive where it can be operated by the engineer in the cab through a suitable mechanism.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one of the embodiments of the invention, Figure 1 is a side view of the apparatus shown applied to a locomotive. Fig. 2 is a front view of the head light. Fig. 3 is a bottom plan view thereof removed from its supporting frame. Fig. 4 is a plan view of the head light.

Similar reference characters are employed to designate corresponding parts throughout the several views.

Referring to the drawing, A designates the headlight which is of any approved construction and having pivots 1 and 2 projecting, respectively, from the top and bottom thereof. The headlight is mounted in a frame B that has top and bottom plates 3 and 4 provided with alining openings for receiving the pivots 1 and 2, the said pivots forming a vertical axis on which the headlight turns in the frame B. This frame is mounted on the front of the locomotive and rests on a bracket C to which it is riveted or otherwise suitably secured. On the bottom of the headlight A are ball or other casters 5 whereby the headlight can freely turn on the bottom plate 4 of the frame B.

Projecting from one side of the headlight and secured thereto is a bracket 6 to which is connected the forward end of an operating rod 7. The bracket 6 is formed of a light rod or stout wire bent upon itself at a middle point to provide an eye to which the operating rod 7 is attached and having the end portions extending in opposite directions and bent inwardly and secured to the frame of the head light near its front and rear sides. This construction provides a substantial connection between the operating rod 7 and the head light. This rod extends rearwardly into the cab C' of the locomotive D and is connected with an operating lever 8 that is located at such a point as to be conveniently within the reach of the engineer without leaving the throttle lever. The lever is pivoted on a toothed sector 10 which is secured to the roof 9 and with which is adapted to coöperate a latch 11 carried by the lever and locked and unlocked by the grip member 12 on the handle of the lever.

Normally, the headlight is locked in central position by means of the latch 11 engaging the toothed sector 10 at its center. As the locomotive approaches a curve, the engineer can shift the headlight to cause the rays therefrom to follow the track, by throwing the lever 8 in one direction or the other after first releasing the latch 11. In this manner, the track can be effectively illuminated at all points and accidents averted.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the appended claim.

Having thus described the invention, what I claim is:—

In a dirigible locomotive head light, the combination of a supporting frame comprising upper and lower plates and a supporting bracket, said plates having vertically alined openings, a head light mounted between said plates and having upper and lower pivots fitted in the openings of said upper and lower plates, casters fitted to the lower side of the head light and adapted to travel upon the lower plate, a bracket attached to a side of the head light and comprising a rod bent to provide a central eye and oppositely extended bent ends attached to the head light near its front and rear sides, and an operating rod connected with the eye of said bracket.

In testimony whereof I affix my signature in presence of two witnesses.

JAMES B. BAUM.

Witnesses:
W. J. WOOD,
WM. A. MARS